May 28, 1940.  C. S. WILEMAN  2,202,475
GRIT COLLECTOR
Filed March 10, 1937  8 Sheets-Sheet 1
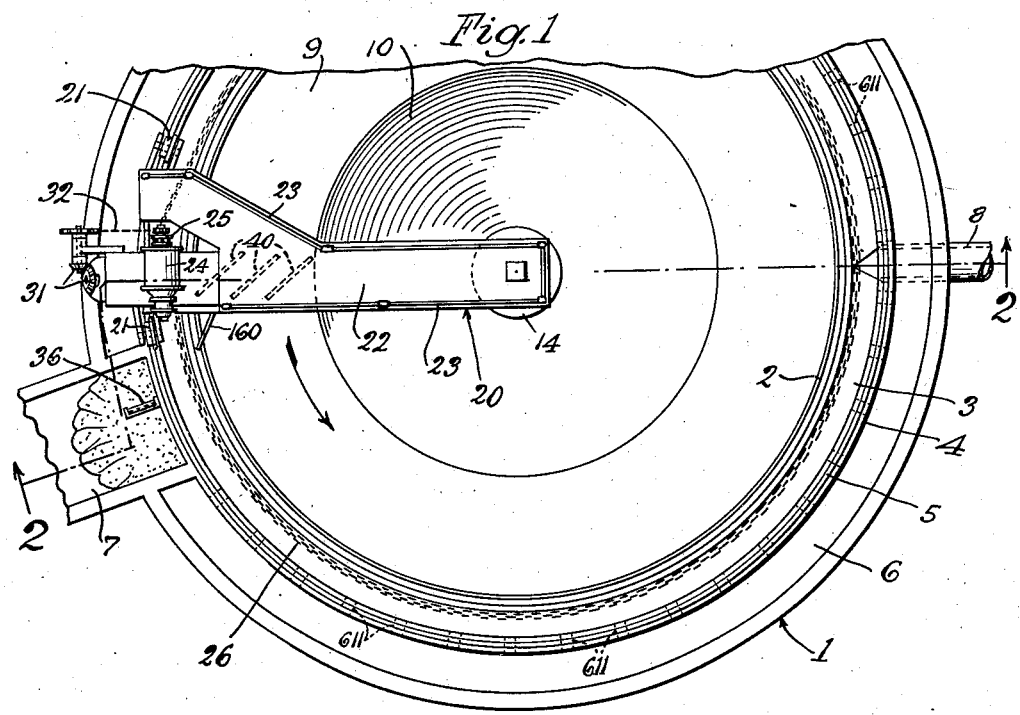
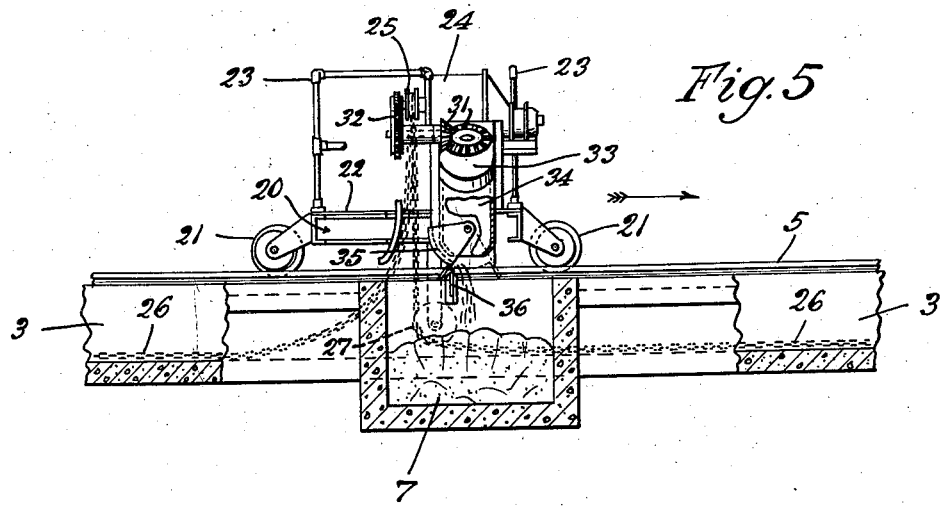
Inventor
Crozier S. Wileman
by Parke & Garth
Attorneys May 28, 1940.  C. S. WILEMAN  2,202,475
GRIT COLLECTOR
Filed March 10, 1937  8 Sheets-Sheet 2
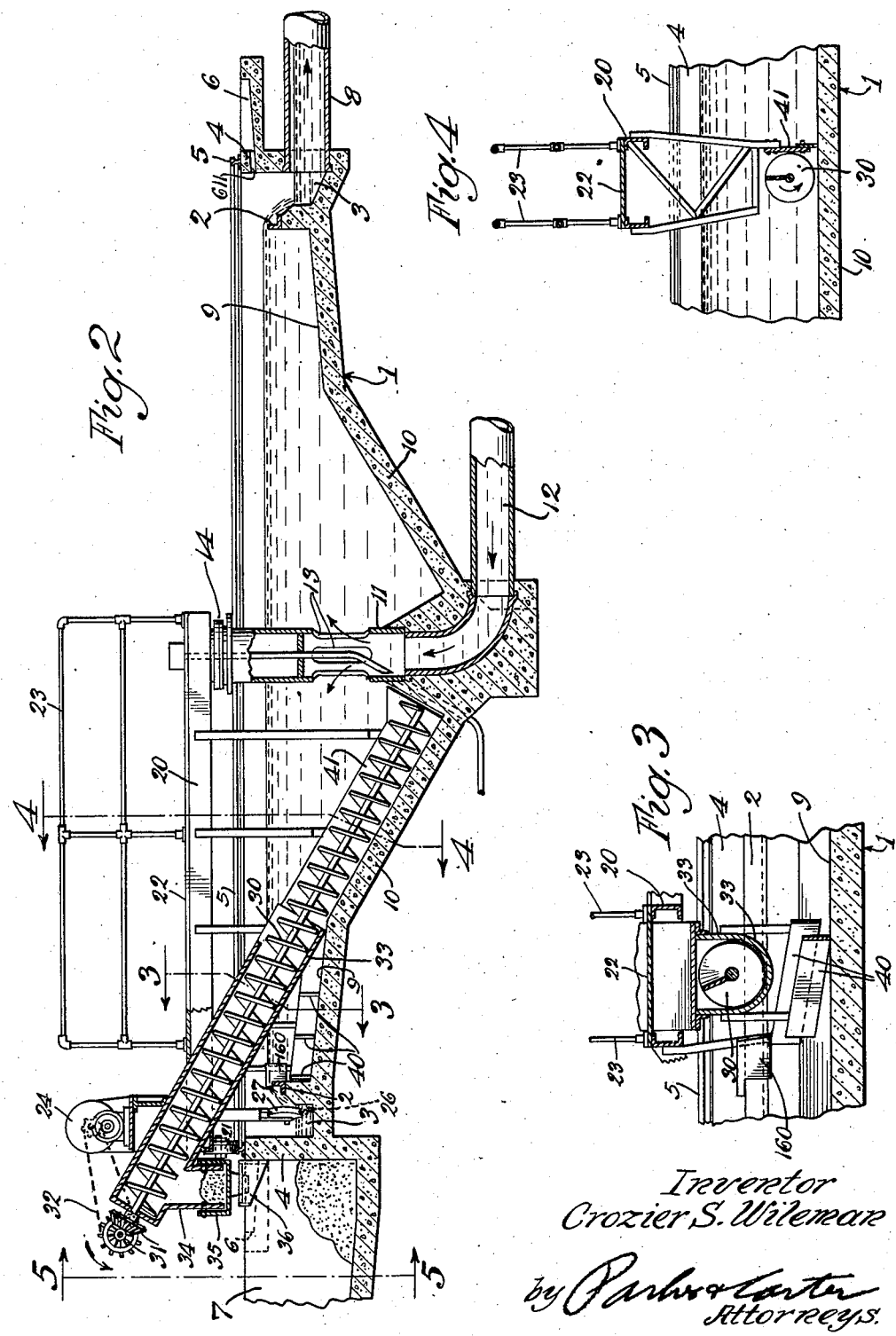
Inventor
Crozier S. Wileman
by Parker & Carter
Attorneys.

May 28, 1940.  C. S. WILEMAN  2,202,475
GRIT COLLECTOR
Filed March 10, 1937  8 Sheets-Sheet 3
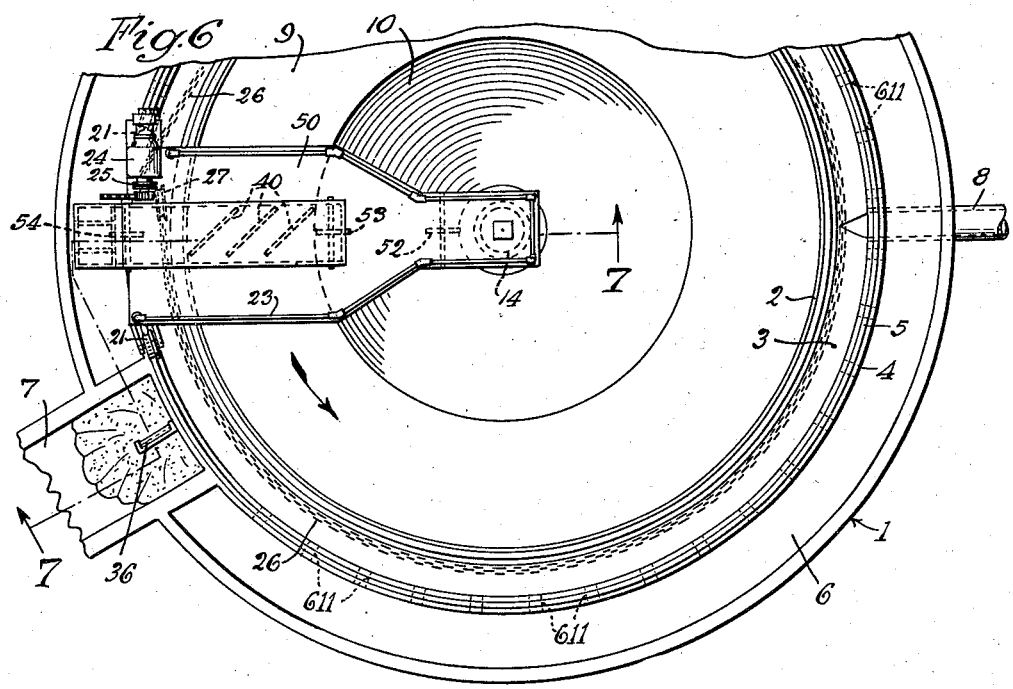
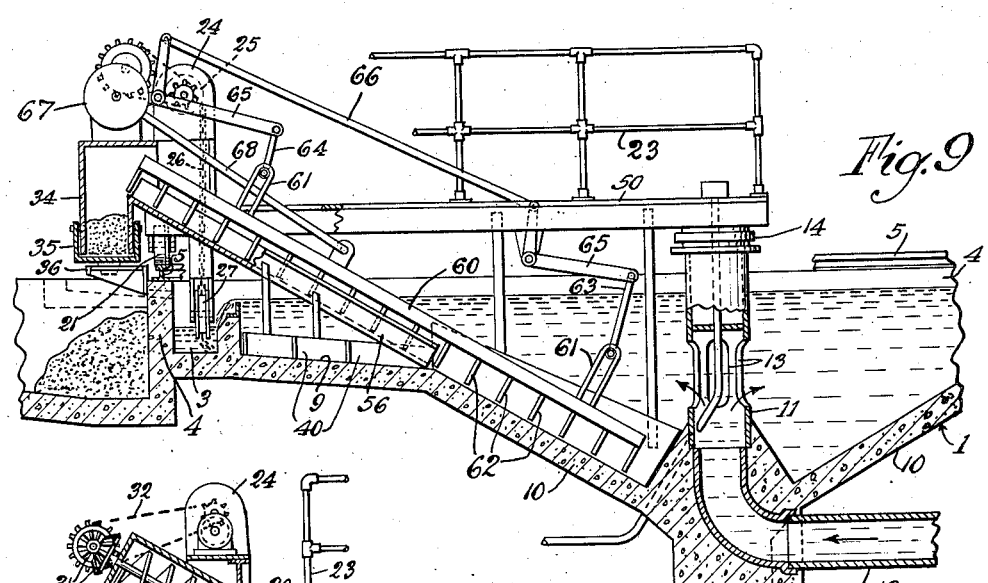
Inventor
Crozier S. Wileman

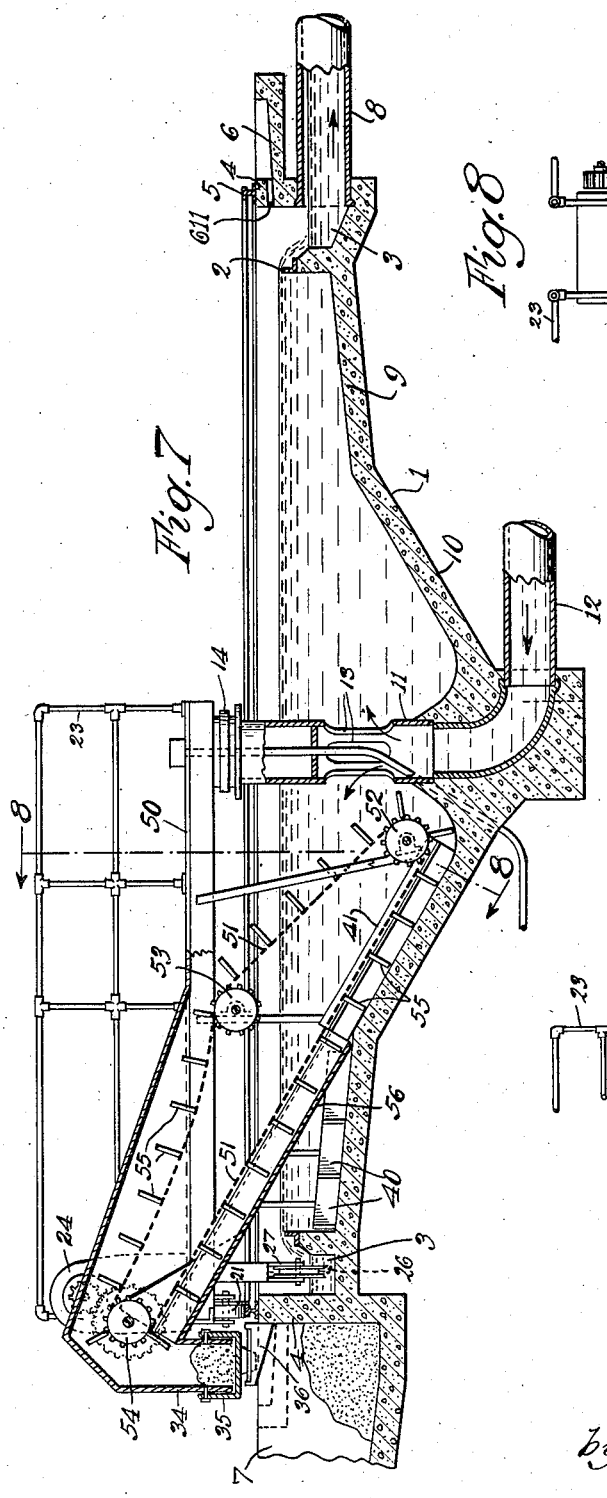
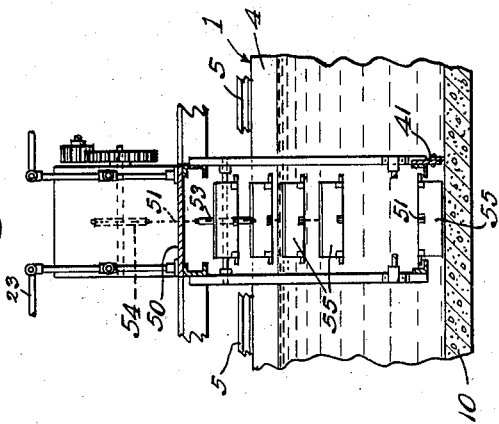
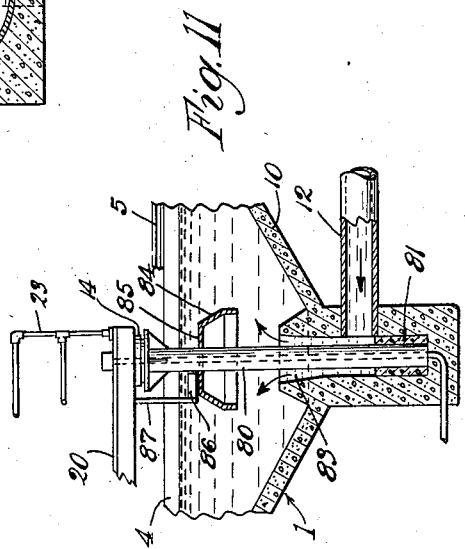
Inventor
Crozier S. Wileman
by Parker & Carter
Attorneys May 28, 1940. C. S. WILEMAN 2,202,475
GRIT COLLECTOR
Filed March 10, 1937   8 Sheets-Sheet 5
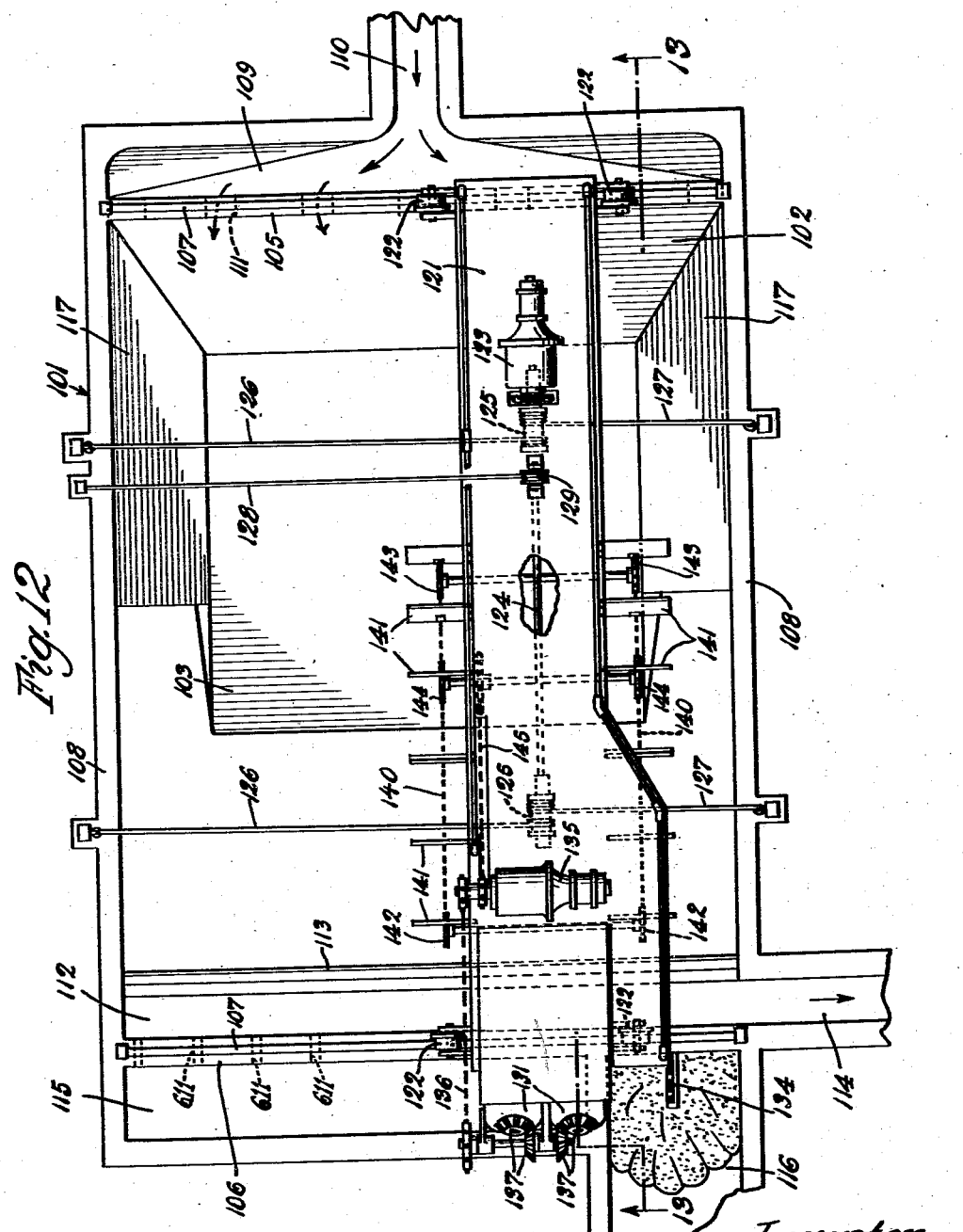
Inventor
Crozier S. Wileman
by Parker & Carter
Attorneys.

May 28, 1940.  C. S. WILEMAN  2,202,475
GRIT COLLECTOR
Filed March 10, 1937   8 Sheets-Sheet 6
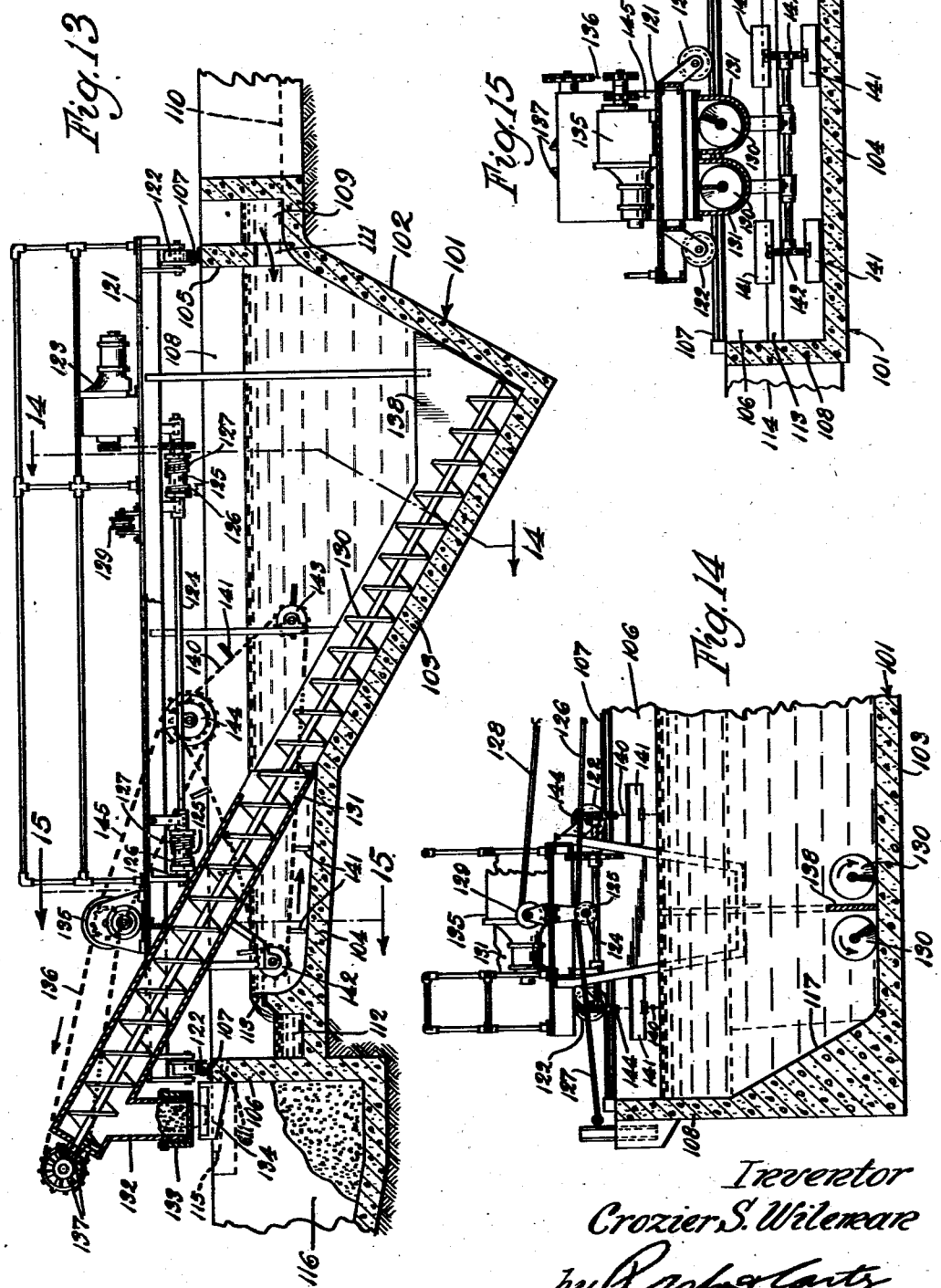

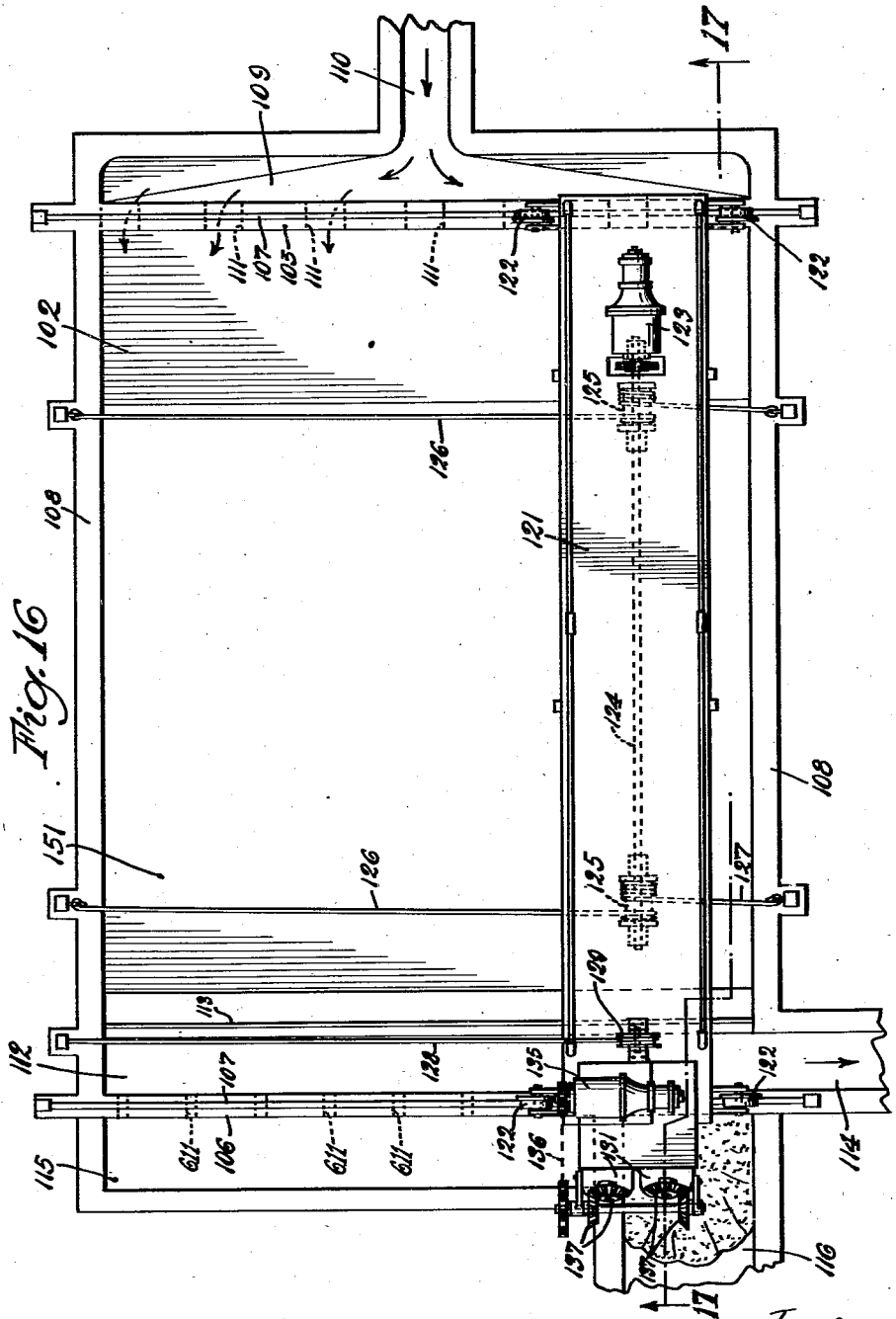

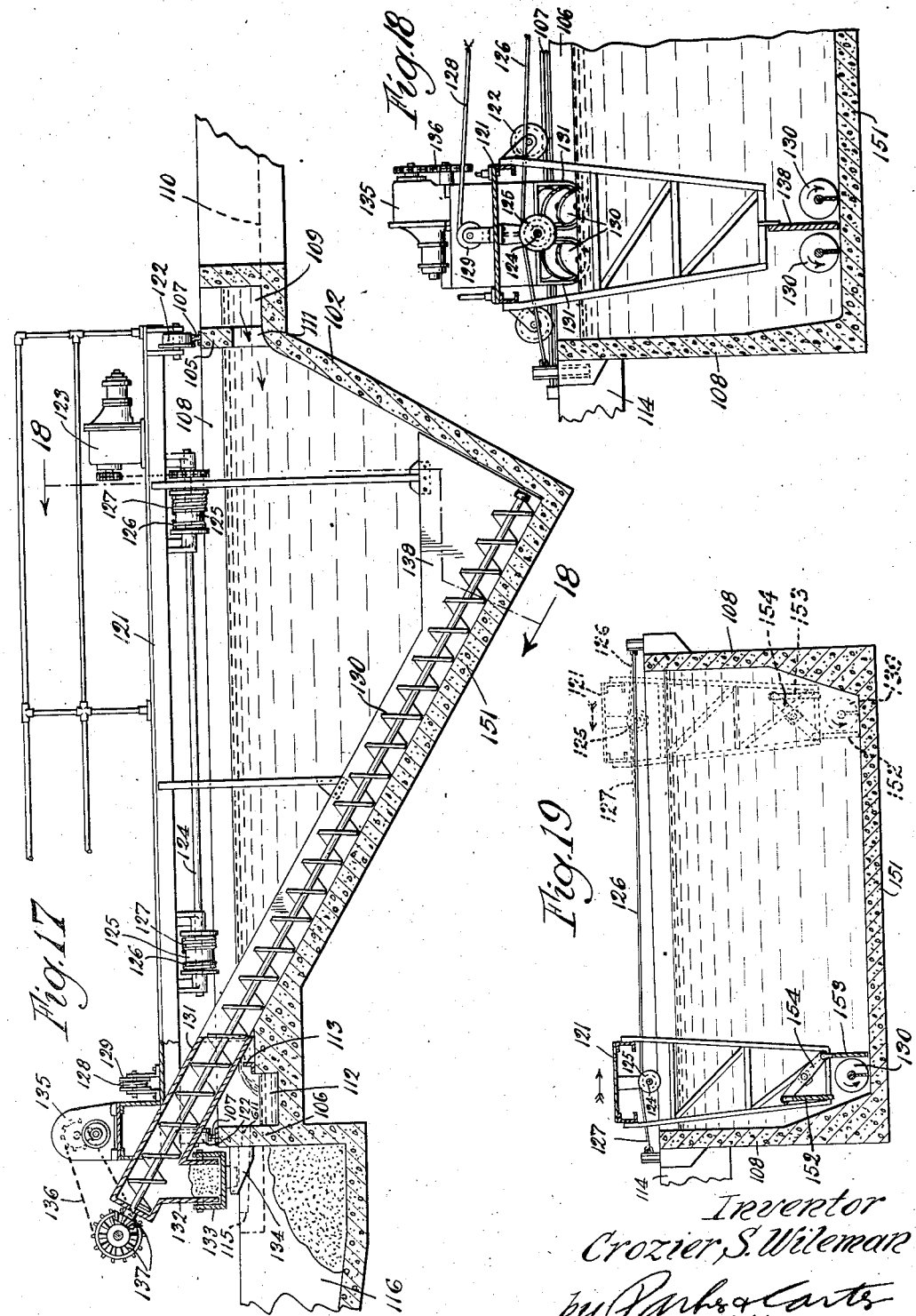

Patented May 28, 1940

2,202,475

UNITED STATES PATENT OFFICE 2,202,475

GRIT COLLECTOR

Crozier S. Wileman, Chicago, Ill., assignor to Link-Belt Company, Chicago, Ill., a corporation of Illinois Application March 10, 1937, Serial No. 130,010

15 Claims. (Cl. 210—3)

My invention relates to apparatus for treating sewage and the like and has for one object to provide a so-called sewage grit chamber or settling tank wherein grit or relatively heavy inorganic material may be settled out of a flowing stream of sewage material and may be subsequently washed and separated from lighter organic material, the organic material being retained in the stream of sewage, the washed grit being discharged from the system.

My invention is adapted to provide means for accomplishing the above purpose and doing it in such a way that change in rate of flow and change in the character of the sewage will have a minimum effect upon the operation of the device.

Other objects will appear from time to time throughout the specification and claims.

My invention is illustrated more or less diagrammatically in the accompanying drawings wherein—

Figure 1 is a plan view of one form of my device;

Figure 2 is a section along the line 2—2 of Figure 1;

Figure 3 is a section along the line 3—3 of Figure 2;

Figure 4 is a section along the line 4—4 of Figure 2;

Figure 5 is a section along the line 5—5 of Figure 2;

Figure 6 is a partial plan view of a modified form;

Figure 7 is a section along the line 7—7 of Figure 6;

Figure 8 is a section along the line 8—8 of Figure 7;

Figure 9 is a section similar to Figures 2 and 7 showing a modified form;

Figure 10 is a section through the periphery of the tank showing a modified form;

Figure 11 is a detail of a modified form of center column;

Figure 12 is a plan view of a modified form of the device wherein a rectangular tank is used;

Figure 13 is a section along the line 13—13 of Figure 12;

Figure 14 is a section along the line 14—14 of Figure 13;

Figure 15 is a section along the line 15—15 of Figure 13;

Figure 16 is a plan view of a further modified form;

Figure 17 is a section along the line 17—17 of Figure 16 illustrating the floor of the tank of constant inclination throughout;

Figure 18 is a section along the line 18—18 of Figure 17;

Figure 19 is a view similar to Figure 18 showing a modified form where a single grit washing screw is used.

1 is a cyclindrical tank having a weir 2, surrounded by an effluent trough 3, which in turn is surrounded by a boundary wall 4, carrying a T-rail 5. Extending outwardly from the boundary wall 4 is a drip trough 6, which drains into the effluent trough 3 through passages 611 in wall 4. 7 is a grit bin. 8 is an effluent pipe connected to the effluent trough 3. The floor of the tank is generally conical and inwardly and downwardly inclined from the periphery. In the form shown, the outer portion of the floor of the tank at 9 is less steeply inclined than the central portion 10. 11 is a hollow influent column extending upwardly from the center of the tank receiving sewage from the influent pipe 12 and discharging through openings 13 to the tank at a point below the water level. This column extends upwardly and carries a ball pivot 14.

20 is a bridge pivoted at one end on the ball pivot and supported by track engaging antifriction wheels 21 at the outer end traveling along the rail 5. The bridge carries a walkway 22 and is provided with a hand rail 23. 24 is a motorized gear reducer on the end of the bridge having a sprocket wheel 25 over which travels the endless chain 26 which chain encircles the tank lying in the effluent trough 3. 27 is a guide wheel carried by the bridge. This wheel guides and supports the chain as it is drawn from its position in the effluent trough up over the sprocket 25 to cause movement of the outer edge of the bridge along the periphery of the tank.

30 is a combined grit washer and screw conveyor supported from the bridge in inclined position, terminating at its inner end adjacent the foot of the column 11, extending at its outer end beyond the peripheral wall 4, and overhanging the drip trough. The axis of this screw conveyor is generally parallel with the surface of the sharply inclined floor of the tank 10 but rises above the less sharply inclined floor 9. This screw washer and conveyor is driven by a pair of mitre gears 31 and chain 32 from the motorized speed reducer 24. Enclosing the screw conveyor 30 is a trough 33 which extends from approximately the boundary between the floor portions 9 and 10 outwardly over the peripheral wall 4 to communicate with a hopper 34 having a gate 35. 36 is a discharge trip for the hopper gate located within the grit bin 7 so that as the bridge goes around carrying the hopper with it the gate is opened when it is in register with the grit bin so as to discharge the grit therefrom to the bin.

The outer periphery of the floor of the tank indicated at 9 is not sufficiently inclined to cause flow of settled material downwardly so a plurality of scrapers 40 are provided carried by the bridge their function being to plow or scrape the deposited sludge toward the center of the tank and toward the sharply inclined trough 10 where it can travel by gravity downwardly into the path of the screw conveyor and washer 30.

41 is a grit plow adjacent the screw conveyor and immediately behind it so that all sludge deposited on the floor 10 will be conveyed forwardly along a tangential path and held within the zone of influence of the screw.

The screw is rotated at a rate of speed sufficient to insure that sludge comprising largely heavy grit or inorganics with some adhering light organics will be propelled tangentially by the plow 41, and be conveyed along the floor 10 upwardly to the trough 33 and thence discharged to the grit bin. The rate of rotation of the screw is such as to furnish a churning or agitating effect at the point of emergence so as to wash organics from the inorganics allowing these lighter particles to flow or float back into the tank. Any heavy organic or floatable material which may have been trapped with the settling grit is agitated by the screw and thrown back into suspension to be carried away by the liquid in the tank.

The organics are prevented from settling, not primarily by the rate of flow of the current in the tank but by the agitating effect resulting from the movements of the bridge, the scraper, the screw and the grit plow as they travel about the periphery of the tank. The rate of travel is kept high enough so as to insure constant agitation at a rate sufficient to prevent the settling of the light organics while not sufficient to interfere with the settling out of the heavy inorganics or grit.

In the modified form shown in Figures 6, 7 and 8, the only difference between the device shown in Figures 1 to 5 is that the bridge 50 is substituted for the bridge 20, this bridge being Y-shaped in cross section to permit positioning of a flight conveyor in place of the screw conveyor 30. The flight conveyor comprises a chain 51 traveling about sprockets 52, 53 and 54 having flights 55. These flights scrape the material upwardly along the floor 10 and along a trough 56 according to the same general principle as the screw conveyor 30.

Figure 9 is a further modified form wherein there is substituted for the screw conveyer or the flight conveyor a reciprocating conveyor comprising a frame 60 suspended on stirrups 61, having conveyor blades 62. The stirrups are supported by links 63, 64 on bell crank levers 65 joined by a link 66 and reciprocated within the connecting rod 68 by cams in the housing 67 driven by the speed reducer.

Figure 10 shows in section a modified form of tank wherein a grit discharge chute 70 carried by the bridge discharges into a deeper grit and drip trough 71, communicating at both ends with the grit bin 7. A scraper 72 is carried by the bridge and pushes the grit around the trough to discharge it into the grit bin.

Figure 11 is a detail section through the center of the tank, in this case the column 80 is solid. It rises from the bottom of the tank, the sewage coming in from the influent pipe 12, is discharged into a funnel 83. A hood diffuser 84 is in register with the funnel adapted to arrest and deflect the upwardly flowing material, the flat portion 85 of the hood is wiped clean of deposit by a wiper blade 86 supported on a bracket 87 on the bridge 20.

The purpose of having the tank with a floor of two different slopes is to permit reduction in the depth of excavation necessary but if desired the scrapers 40 may be omitted and the floor of the tank would then be made with the same slope throughout and the trough 33 could commence adjacent the effluent weir rather than adjacent the break between the two angles of the floor. This floor arrangement is shown in connection with a different type of tank in one of the other modified forms of the device.

In the modified form shown in Figures 12 to 15, 101 indicates a rectangular tank having a V-shaped bottom, one side of which 102, is so sharply inclined that there will be no appreciable deposit of sludge thereon, the sludge sliding by gravity freely down therealong; the other part of the bottom or floor 103 is less sharply inclined. Associated with the sharply inclined floor 103 is a still less sharply inclined floor 104 adapted to support sludge which may be deposited thereon. The tank is bounded by longitudinal walls 105, 106 which carry tracks or rails 107 and bounded by end walls 108. 109 is an influent trough supplied with sewage through the channel 110 and discharging sewage into the tank at a point below the water level through the apertures 111. 112 is an effluent trough associated with a weir 113 and discharging through an effluent channel 114. 115 is a drip trough carried on the wall 106 draining through ports 611 in wall 106 into the effluent trough 112. 117, 117 are floor panels adjacent the walls 108 also sharply inclined downwardly so as to permit free flow by gravity of the sludge.

121 is a bridge extending from end to end of the track having anti-friction rollers 122, adapted to travel respectively along the tracks 107. 123 is a motorized speed reducer driving a longitudinal shaft 124. On this shaft are drums 125 about which are wound cables 126, 127, the cables being anchored respectively at their ends on the walls 108. 128 is an electric cable anchored on the wall 108 and wound about a spring reel 129 whereby electric current is brought to the bridge. The motor of the motorized speed reducer 123 is automatically reversible so that as the motor operates it shuttles the bridge back and forth across the tank, reversing at each end of its excursion. The means for accomplishing this are standard electric control switches which are not illustrated.

Suspended on the bridge 121 is a screw conveyor 130. Its axis is generally parallel with the floor 103. It is enclosed in a trough 131 which extends upwardly from the floor 103 across the wall 106 and communicates with a grit hopper 132 having a gate 133 adapted to discharge into the grit bin 116 when the gate is opened by the gate opening stop 134. The screw conveyor is driven from a motorized speed reducer 135 by means of a chain drive 136 and the mitre gears 137. It will be understood that there are a pair of these screw conveyors, each in a separate trough both adapted to operate in unison. 138 is a grit plow interposed between the two conveyors and adapted to travel along the floor of the tank.

Also mounted on the bridge are a pair of flight conveyors comprising chains 140, flights 141, the chains traveling over sprockets 142, 143, 144. The sprockets 144 are driven by a chain drive 145 from the motorized speed reducer 135. These flight conveyors travel along the surface 104 and since there is one conveyor on each side of the bridge, these conveyors scrape sludge across the floor 104 into the hopper formed between the floor 103, 102 and 117 and in whichever direction the bridge is moving, the leading flight conveyor scrapes the freshly deposited sludge down into the hopper where it can be picked up by the plow and the screw conveyors and conveyed upwardly, washed and discharged as in the previously discussed figures.

In the modified form shown in Figures 16, 17 and 18, the rectangular tank has merely the two inclined floors 102 and 151. Two screw conveyors 130 are supported on the bridge 121 and the flight conveyors are omitted. In this case, each screw conveyor comes clear to one end of the tank and does its work on the sludge in the tank without the interposition of the flight conveyor, the tank floor being such that all the sludge comes into the zone of influence of the screw conveyor and washer.

In the modified form shown in Figure 19 but a single screw conveyor 130 is used and it is associated with two grit plow blades 152, 153 supported on the bridge mounted on a rocker arm 154 with a trip mechanism adapted to trip the rocker arm at each end of its excursion so that the grit plow is always on the rear side of the screw conveyor. The details of this trip mechanism are not shown as it forms no part of the present invention and is a standard engineering product.

In a grit washer of the type here disclosed where the influent reaches the tank at the center and discharges along radial lines to the periphery and over a peripheral weir, the influent velocity at the center is high and progressively decreases toward the periphery, at the center the flow velocity is sufficient to sustain the organics. At the periphery the flow velocity is insufficient to sustain organics. The flow velocity throughout is insufficient to sustain or prevent the settling of the inorganic grit.

The combined collector grit washer and agitation structure as it travels around the tank has its linear velocity at a maximum at the periphery, decreasing at the center so that in that part of the tank where flow velocity is not sufficient to prevent sedimentation of the organics, the agitating effect supplements or substitutes for flow velocity. At the center where the velocity of flow is high enough, the relatively low linear speed of the agitation makes no difference.

The weir which controls the level of liquid in the tank is subject to unsightly entrapment of solid organic material and so I provided a scraper 160 carried by the agitator and engaging the weir to scrape off and displace any organic material which may otherwise be caught and remain to be unsightly or to create a nuisance.

I have shown in my specification and drawings a number of modified forms of the device with different shapes of tank, different types of conveyor and washer and various different combinations. Of course, many other combinations of these same elements or different elements might be adopted without departing materially from the spirit of my invention and I wish, therefore, that my showing be regarded as in a sense diagrammatic.

In general I propose that the agitation will be such as to prevent the settling out of lighter organic solids, while permitting settling out of heavier organic solids. This must be regarded, of course, as a general line of demarcation. There may be organic solids which will settle, there may be inorganic solids which will not settle. Even some lighter inorganic solids may be carried down with the heavier and settled, and the general proposition is that the division line is between certain heavy solids and certain light solids, and the heavy solids are to be disposed of in one way and the light solids in another.

I claim:

1. Means for separating heavy solids from liquid containing both heavy and light solids, comprising a settling tank adapted to contain the liquid to be treated, means, for positively agitating the entire body of the liquid to prevent settlement of the lighter solids, means for collecting the heavier settled solids, means for agitating the liquid and heavier solids to wash the lighter solids from the heavy, and means for discharging the heavier solids from the system while retaining the lighter solids in the liquid, said means including a combined agitator and conveyor and means for propelling it bodily through the liquid at a rate of speed such that the entire body of liquid in the tank is maintained in a continuous state of agitation substantially greater than any possible agitation resulting from the flow of liquid through the tank.

2. Means for separating heavy solids from liquid containing both heavy and light solids, comprising a settling tank adapted to contain the liquid to be treated, means, for positively agitating the entire body of the liquid to prevent settlement of the lighter solids, means for collecting the heavier settled solids, means for agitating the liquid and heavier solids to wash the lighter solids from the heavy, and means for discharging the heavier solids from the system while retaining the lighter solids in the liquid, said means including a combined agitator and conveyor and means for propelling it bodily through the liquid at a relatively high rate of speed and means independent of its bodily movement for operating it to convey and agitate material.

3. Means for separating heavy solids from liquid containing both heavy and light solids, comprising a settling tank adapted to contain the liquid to be treated, means, for positively agitating the entire body of the liquid to prevent settlement of the lighter solids, means for separately collecting the heavier settled solids, for agitating the liquid and heavier solids to wash the lighter solids from the heavy, and means for discharging the heavier solids from the system while retaining the lighter solids in the liquid, said means including a combined agitator and conveyor partially immersed in the liquid in the tank and extending upwardly therefrom toward the periphery of the tank and means for propelling it bodily through the liquid at a rate of speed such that the entire body of liquid in the tank is maintained in a continuous state of agitation substantially greater than any possible agitation resulting from the flow of liquid through the tank.

4. Means for separating heavy solids from liquid containing both heavy and light solids, comprising a settling tank adapted to contain the liquid to be treated, means, for positively agitating the liquid to prevent settlement of the lighter solids, for collecting the heavier settled solids, for agitating the liquid and heavier solids to wash the lighter solids from the heavy, for retaining the lighter solids in the liquid and for discharging the heavier solids from the system, said means including a combined agitator and conveyor partially immersed in the liquid in the tank and extending upwardly therefrom toward the periphery of the tank and means for propelling it bodily through the liquid at a relatively high rate of speed to agitate the liquid, and means independent of its bodily movement for operating it to convey and discharge material.

5. A grit chamber for sewage plants comprising a circular tank having an inclined floor, a centrally disposed influent port, a peripheral effluent weir, a combined grit washer and conveyor extending from the center toward and across the effluent weir, means for propelling the conveyor bodily along the periphery to collect settled sludge and agitate the liquid in the tank and for operating the conveyor to propel settled sludge radially, wash the sludge at the point of emergence from the liquid in the tank and discharge the sludge from the system 6. A grit chamber for sewage plants comprising a circular tank having an inclined floor, a centrally disposed influent port, a peripheral effluent weir, a combined grit washer and conveyor extending from the center toward and across the effluent weir means for propelling the conveyor bodily along the periphery to collect settled sludge and agitate the liquid in the tank and for operating the conveyor to propel settled sludge radially, wash the sludge at the point of emergence from the liquid in the tank and discharge the sludge from the system, the conveyor being substantially parallel with the central portion of the tank floor and inclined to the outer portion thereof.

7. A grit chamber for sewage plants comprising a circular tank having an inclined floor, a centrally disposed influent port, a peripheral effluent weir, a combined grit washer and conveyor extending from the center toward and across the effluent weir, means for propelling the conveyor bodily along the periphery to collect settled sludge and agitate the liquid in the tank and for operating the conveyor to propel settled sludge radially, wash the sludge at the point of emergence from the liquid in the tank and discharge the sludge from the system, the conveyor being substantially parallel with the central portion of the tank floor and inclined to the outer portion thereof, scrapers carried by the conveyor adapted to agitate and propel sludge settled on the peripheral portion of the floor of the tank centrally and discharge it to the central portion of the tank where it may be picked up by the conveyor.

8. A grit chamber for sewage plants comprising a circular tank having an inclined floor, a centrally disposed influent port, a peripheral effluent weir, a combined grit washer and conveyor extending from the center toward and across the effluent weir, means for propelling the conveyor bodily along the periphery to collect settled sludge and agitate the liquid in the tank and for operating the conveyor to propel settled sludge radially, wash the sludge at the point of emergence from the liquid in the tank and discharge the sludge from the system, the conveyor comprising a shaft having a spiral flight thereon, a radial sludge plow associated with the flight and a trough enclosing that part of the conveyor which extends over the weir.

9. A grit chamber for sewage plants comprising a circular tank having an inclined floor, a centrally disposed influent port, a peripheral effluent weir, a combined grit washer and conveyor extending from the center toward and across the effluent weir, means for propelling the conveyor bodily along the periphery to collect settled sludge and agitate the liquid in the tank and for operating the conveyor to propel settled sludge radially, wash the sludge at the point of emergence from the liquid in the tank and discharge the sludge from the system, a grit bin outside the periphery of the tank, a hopper into which the conveyor discharges and means responsive to the movement of the conveyor for opening the hopper to cause it to discharge into the grit bin when it is in register therewith.

10. In combination, a circular sedimentation tank, means for introducing solids bearing liquid to the tank adjacent the center thereof and for withdrawing it from the tank about the periphery thereof, the rate of flow of liquid to the tank from the center toward the periphery decreasing from a maximum adjacent the influent zone sufficient to hold solids in suspension to a minimum adjacent the effluent zone which is insufficient to hold solids in suspension, mechanical means in the tank for agitating the fluid comprising a member rotatable about a central point adjacent the influent zone and means for moving the agitating means along the effluent zone whereby the linear rate of travel and the agitating effect resultant therefrom increases radially from the influent toward the effluent zone, the agitation resulting from the rotation of the mechanical means only being insufficient to hold solids in suspension adjacent the influent zone but sufficient to hold solids in suspension adjacent the effluent zone.

11. In combination, a circular sedimentation tank, a circular weir surrounding it, an agitating and conveying member rotating about a center concentric with the weir and traveling along the weir and a scraper carried by the conveying member and traveling along and cleaning the weir.

12. The method of controlling the gravital separation of suspended solids from liquids which consists in discharging a stream of liquid containing solids in suspension into a settling zone, causing the liquid to flow radially outwardly from the point of entrance into said zone whereby the velocity of flow decreases gradually and uniformly from a maximum adjacent the influent point where it is sufficient to maintain solids in suspension to a minimum adjacent an effluent zone where the velocity is insufficient to hold solids in suspension and in imparting to the mass of liquid, independent of the rate of flow thereof an agitation increasing gradually in the direction of liquid flow from a minimum adjacent the influent point to a maximum adjacent the effluent zone and adjusting such rate of imparted agitation with respect to the flow rate that the imparted agitation plus the flow rate is sufficient throughout the entire liquid mass to uniformly maintain lighter solids in suspension while permitting heavier solids to settle out.

13. In combination, a circular sedimentation tank, means for introducing liquid containing solids in suspension to the tank adjacent the center thereof and for withdrawing the liquid from the tank about much of the periphery thereof, the rate of flow of liquid in the tank from the center of the periphery decreasing from a maximum adjacent the influent zone sufficient to hold solids in suspension to a minimum adjacent the effluent zone insufficient to hold solids in suspension, a rotary screw conveyor extending radially of the tank generally adjacent the bottom thereof, upwardly inclined from beneath the liquid level adjacent the center to above the liquid level adjacent the periphery, means for rotating said conveyor about its longitudinal axis and for revolving the conveyor about the central axis of the tank, means associated with the conveyor tending to hold much of the material presented to it in juxtaposition therewith during its revolving movement whereby both the revolving and the rotation of the conveyor cooperate to agitate and wash settled solids presented to the conveyor.

14. A grit chamber for sewage plants comprising a circular tank having an inclined floor, a centrally disposed influent port, a peripheral effluent weir, a combined grit washer and conveyor extending from the center toward and across the effluent weir, means for propelling the conveyor bodily along the periphery to collect settled sludge and agitate the liquid in the tank and for operating the conveyor to propel settled sludge radially, wash the sludge at the point of emergence from the liquid in the tank and discharge the sludge from the system, the conveyor comprising a chain, flights thereon adapted to travel along the floor of the tank and a radial scraper adapted to be rotated about the tank with the conveyor behind the conveyor flights.

15. A grit chamber for sewage plants comprising a circular tank having an inclined floor, a centrally disposed influent port, a peripheral effluent weir, a combined grit washer and conveyor extending from the center toward and across the effluent weir, means for propelling the conveyor bodily along the periphery of the tank to collect settled sludge and agitate the liquid in the tank, means for operating the conveyor to propel settled sludge radially, a part of the conveyor being adapted to wash the sludge at the point of emergence from the liquid in the tank and to discharge the sludge from the system, the conveyor comprising a plurality of reciprocating blades, means for bringing them into engagement with the floor of the tank, moving them outwardly, lifting them and returning them toward the center of the tank out of contact with the floor.

CROZIER S. WILEMAN.